United States Patent Office 3,751,530
Patented Aug. 7, 1973

3,751,530
FREE RADICAL ADDITION OF DITHIOPHOSPHONIC AND DITHIOPHOSPHINIC ACIDS TO ACETYLENES
Alexis A. Oswald, Mountainside, and George N. Schmit, Parlin, N.J., assignors to Esso Research and Engineering Company
No Drawing. Filed May 28, 1968, Ser. No. 732,553
The portion of the term of the patent subsequent to Sept. 5, 1984, has been disclaimed
Int. Cl. C07f 9/32, 9/36, 9/40
U.S. Cl. 260—978                                          4 Claims

ABSTRACT OF THE DISCLOSURE

Dithiophosphonic and dithiophosphinic acid esters can be prepared by free radical addition of the corresponding dithiophosphonic and dithiophosphinic acids to unsaturated compounds, such as olefinic and acetylene compounds, e.g. vinyl chloride, butadiene, allene, methylacetylene, etc. The novel unsaturated mono-adducts of this reaction such as O-ethyl-S-propenyl ethanedithiophosphonate, e.g., are useful as pesticides, particularly as insecticides, and lubricating oil additives such as antioxidants, etc.

FIELD OF INVENTION

This invention relates to free radical addition of dithiophosphonic and dithiophosphinic acids to unsaturates, the novel unsaturated products thereof, and the use of such mono-adducts as pesticides and oil additives. More particularly, this invention relates to: (1) processes for preparation of dithiophosphonic and dithiophosphinic esters by free radical addition of aliphatic and aromatic dithiophosphonic and dithiophosphinic acids to unsaturates, such as vinyl chloride, butadiene, allene, methylacetylene, etc.; (2) the novel unsaturated mono-adducts formed by the processes of (1); and (3) methods for using the mono-adducts of (2) as pesticides and oil additives.

PRIOR ART

Preparation of dithiophosphonic and dithiophosphinic acid esters is well known. Such esters are usually prepared by displacement reactions of the corresponding acid salts or chlorides. As described in Houben-Weyl, Methoden der Organischen Chemie, volume XII/1, Organische Phosphor-Verbindungen, pages 284–285, 586–590, Ed. E. Mueller, Publ. G. Thieme Verlag, Stuttgart, Germany, 1963.

Recently, dithiophosphonates and dithiophosphinates have been prepared by ionic addition. For example, German Patents Nos. 1,071,701 and 1,102,138 disclose the spontaneous, ionic addition of dithiophosphonic and dithiophosphinic acids to vinylic sulfides.

However, it has not been heretofore known to prepare dithiophosphonic and dithiophosphinic acid esters by means of free radical addition of the corresponding dithiophosphonic and dithiophosphinic acids to unsaturates, such as olefinic and acetylenic compounds. Moreover, unsaturated dithiophosphonate and dithiophosphinate ester compositions have likewise not been previously known, nor has their unexpected activity as pesticides and oil additives been known as well.

SUMMARY OF THE INVENTION

In accordance with the present invention, therefore a thiol acid of phosphorus having the general formula,

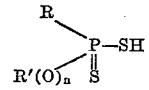

where R and R' are each the same or different $C_1$–$C_{30}$ monovalent hydrocarbyl radical or substituted derivative thereof, preferably a $C_1$–$C_6$ hydrocarbyl or $C_1$–$C_6$ monosubstituted hydrocarbyl radical, most preferably phenyl, monosubstituted phenyl, $C_1$–$C_5$ alkyl, $C_1$–$C_5$ monosubstituted alkyl and $n$ is 0 or 1, is reacted in a free radical process with an unsaturated compound containing one or more olefinic and/or acetylenic bonds to produce the corresponding adducts. The reactive unsaturation can be in a terminal or an internal position, and the internal unsaturation can occur in an open chain or be part of a cyclic system.

Examples of suitable dithiophosphonic and dithiophosphinic acid reactants are:

O-ethyl methanedithiophosphonic acid, O-isopropyl methanedithiophosphonic acid, O-cyclohexyl methanedithiophosphonic acid, O-ethyl 4-methoxybenzenedithiophosphonic acid, O-dodecyl 2-naphthalenedithiophosphonic acid, O-ethyl 4-chlorobenzenedithiophosphonic acid, O-methyl chloromethanedithiophosphonic acid, phenyl benzenedithiophosphonic acid, diethyl dithiophosphinic acid, dibutyldithiophosphinic acid, dicyclohexyl dithiophosphinic acid, dibenzyl dithiophosphinic acid, diphenyl dithiophosphinic acid, dimethylphenyl dithiophosphinic acid, dichlorophenyl dithiophosphinic acid, trimethylene dithiophosphinic acid.

Any olefinic or acetylenic compound can serve as a free radical reactant for the above acids if it does not contain groups which enter into other reactions under the reaction conditions employed. Because of the interfering salt forming reaction, for example, free unsaturated bases are not suitable reactants for the present free radical additions.

Although any olefinic and/or acetylenic compound can be used, with the above limitations, they are usually selected from compounds of the general formulae

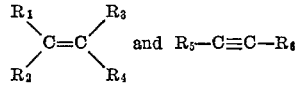

where $R_1$ to $R_6$ inclusive are hydrogen; cyano; fluorine, chlorine, bromine; and a $C_1$–$C_{28}$ organic radical such as carboalkoxy, acyl, etc. More preferably, the $C_1$–$C_{28}$ organic radical is a $C_1$–$C_{28}$ monosubstituted hydrocarbyl radical such as chloromethyl, hydroxyethyl, carboalkoxymethyl, chlorobenzyl, methylthiophenyl, chlorooctadecyl, chlorovinyl, etc.; most preferably it is a $C_1$–$C_{28}$ hydrocarbyl radical such as methyl, dodecyl, t-butyl, propynyl, phenyl, octadecylphenyl, vinyl, benzyl, etc. It is preferable that the unsaturated compound have at least one hydrogen substituent. In the case of the olefinic reactant it is preferable that it have two hydrogen substituents. In the case of the acetylenic reactant, which itself is a preferred reactant, it is preferable that it be only monosubstituted. It is most preferable, however, that the unsaturated reactants have only one non-hydrocarbon organic group substituent.

The novel free radical additions of this invention to mono-olefinic or isolated di- and poly-olefinic unsaturation lead to the corresponding anti-Markovnikov type adducts. For example, in the case of a compound containing an isolated, terminal olefinic group, the following reaction takes place.

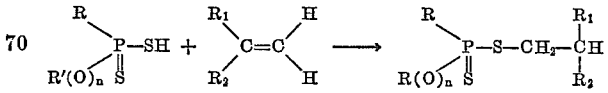

In contrast to the known ionic additions of dithiophosphonic acids, the present radical additions produce the less branched adduct isomer.

In another characteristic case, an $n$-$\alpha,\omega$-diolefin reacts in a free radical manner yielding both the mono- and diadducts.

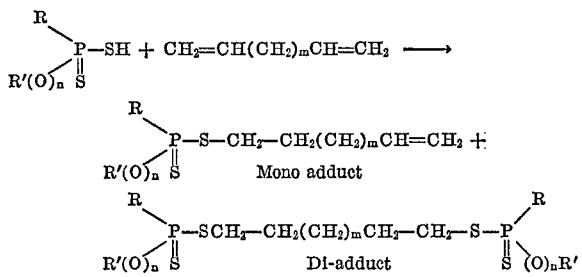

As illustrated by the present reaction scheme in one embodiment of this invention the diolefins and polyolefins containing isolated double bonds react at one or more sites of unsaturation to yield the corresponding phosphorus esters attached at the olefinic carbon atom having more hydrogen atoms, in accordance with the anti-Markovnikov principle.

In contrast to diolefins having isolated double bonds, conjugated diolefins in another embodiment of this invention were found to react to yield primarily the monoadducts.

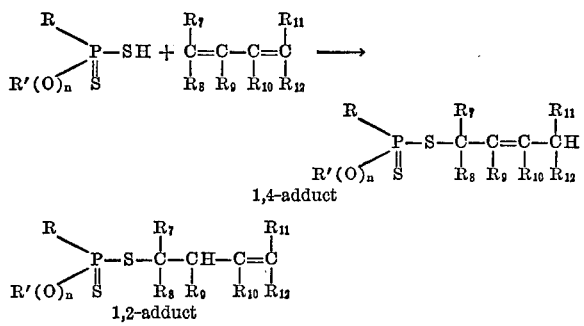

where $R_7$–$R_{12}$ inclusive can be hydrogen; halogen, preferably chlorine or fluorine; cyano; $C_1$–$C_4$ alkyl, preferably methyl; and phenyl or mono-substituted phenyl, such as chlorophenyl, nitrophenyl, etc. It is preferred to have at least 4 hydrogen substituents on the conjugated carbon skeleton. The non-hydrocarbon substituents are preferably on the inner carbon atoms of the starting conjugated diene.

Some of the preferred conjugated dienes of the above type are: butadiene, isoprene, chloroprene, cyanoprene, 2,3-dimethyl butadiene, piperylene, and 1-phenylbutadiene, etc.

Other conjugated cyclic dienes, such as 1,3-cyclopentadiene, 1,3-cyclohexadiene, 1,3-cyclooctadiene, 1,3-cyclododecadiene, etc. similarly undergo 1,4- and/or 1,2-mono addition.

The parent conjugated diene, butadiene, and internally substituted dienes such as isoprene yield mainly the thermodynamically more stable 1,4-monoadduct:

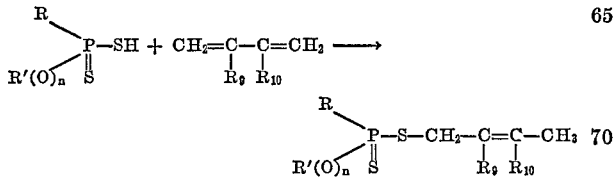

Terminally substituted dienes such as piperylene yield major quantities of both the 1,2- and the 1,4-monoadducts. Diaddition to conjugated dienes in general takes place much slower than monoaddition because the monoadduct intermediates have less reactive internal unsaturation.

In still another embodiment of this invention, cumulative dienes yield the corresponding mono- and diadducts. It is believed that their respective formation is by a concurrent terminal and center attack mechanism as presented in the following equations:

Terminal Attack:

Center Attack:

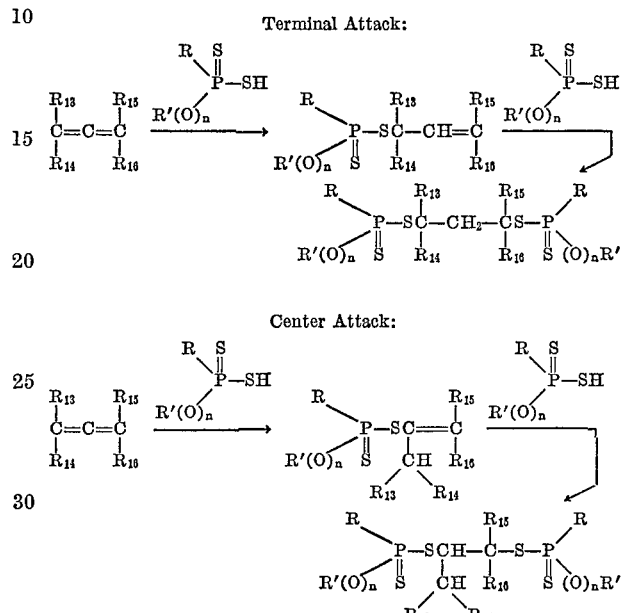

where $R_{13}$–$R_{16}$ can be hydrogen, halogen, cyano, $C_1$–$C_{12}$ hydrocarbyl preferably alkyl, most preferably methyl, $C_1$–$C_6$ substituted hydrocarbyl.

The cyclic cumulative dienes react in a similar manner.

In a prefered embodiment the parent cumulative allene reacts to yield mainly terminal mono-adduct.

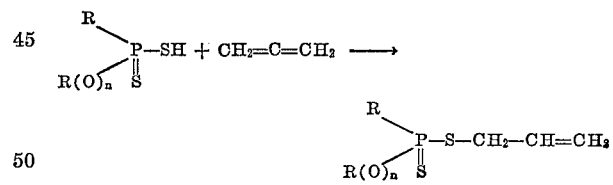

In yet another embodiment of this invention, dithiophosphonic or dithiophosphinic acids react with acetylenes to yield the corresponding mono- and diadducts as shown in the following equations.

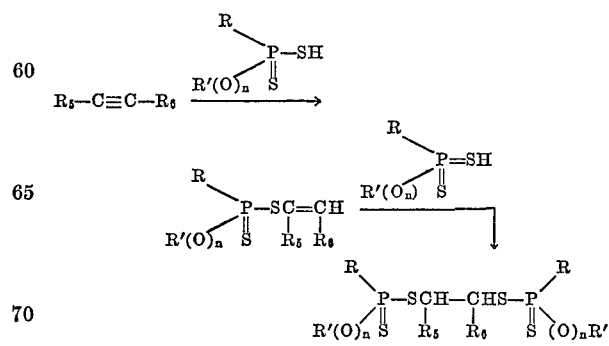

where $R_5$ and $R_6$ are the same as before. The acetylenic unsaturation can be part of a cyclic system.

Unsymmetrical acetylenes react in an anti-Markovnikov manner to yield mainly the corresponding vinylic monoadducts.

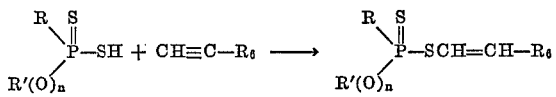

Among the preferred monosubstituted acetylenic reactants are alkylacetylenes having preferably, a $C_1$ to $C_4$ alkyl substituent and arylacetylenes. The most preferred acetylenic reactants are methylacetylene; phenylacetylene and its monosubstituted derivatives such as chlorophenylacetylene; monosubstituted $C_1$ to $C_6$ alkylacetylene derivatives such as propargyl alcohol, propargyl chloride, propargyl methyl sulfide, and acetylenic carboxylic esters such as ethyl propiolate, etc.

The foregoing free radical additions can be effected in the presence or in the absence of initiators. However, the use of one or more free radical initiator is usually preferred. Exemplary of such initiators are chemical initiators such as e.g., peroxides, such as t-butyl peroxide and azo compounds such as azobisisobutyronitrile and/or radiation, for example, light, gamma-irradiation, heat, etc. The amount of chemical initiators ranges from 0.001 to 10 mole percent, preferably from 0.1 to 3 mole percent.

Temperatures employed in these free radical reactions generally range from about —100° C. to about 200° C., preferably from about —30° C. to about 150° C. In the case of chemical initiators, the preferred reaction temperatures would be of course dependent upon the thermal stability of the initiators. Reaction temperatures are used at which the initiator is decomposed at a reasonable rate to generate a desirable concentration of free radicals. If ultraviolet and gamma irradiation are used to initiate the reaction, ambient or low temperatures are preferable. A simultaneous initiation by chemical initiators and radiation can be of advantage. Sometimes the reaction temperature can be limited by the thermal stability of the reactants; it can also be limited in order to avoid undesirable ionic side reactions.

The minimum pressure of the free radical reactions is that which keeps the reaction mixture in the liquid phase. In the case of some gaseous unsaturated reactants such as ethylene and acetylene, e.g., superatmospheric pressures may be necessary. Subatmospheric, e.g., 0.5 atmosphere as well as superatmospheric pressures, e.g., 100 atmospheres can be used.

The molar ratio of acid to unsaturate is not critical. About 0.1 to about 10 moles of acid can be employed per mole of unsaturation. The preferred molar ratio is 0.1 to 3 moles of acid per mole of unsaturate. In the case of acetylene and dienes, an excess of the unsaturate can be used to favor the formation of the corresponding monoadduct.

In general, the free radical additions are carried out in the absence of solvents to yield liquid products. Solvents can be employed, however, and can be of advantage for the dissolution of gaseous reactants and of solid products. Useful solvents are those that are inert to the reactants and do not inhibit the free radical initiation and propagation processes which lead to the formation of the desired adducts. Exemplary of such useful solvents are aliphatic and aromatic hydrocarbons as well as ethers and thioethers.

The reaction is normally carried out for a period of time sufficient to form a substantial amount of the free radical adduct, e.g., 10 minutes to about 300 hours preferably 1 to 24 hours. The unreacted acid is preferably removed as its water soluble sodium or ammonium salt. The unreacted unsaturate is then removed, preferably by distillation. Purification of the crude adducts can be accomplished by fractional distillation, preferably in vacuo.

While some of the dithiophosphonates and dithiophosphinates are known compounds and can be prepared by the presently claimed process as well as by other known processes, several types of novel compounds as well can be prepared by the present process. The present process is uniquely suited for the preparation of such new compounds.

The novel dithiophosphonic and dithiophosphinic acid ester monoadducts resulting from addition to halogenated mono-olefins are defined by the following formula:

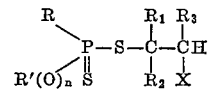

where R and R' are as before; $R_1$ to $R_3$ are hydrogen; F; Cl; or Br; cyano; and methyl etc.; X is F, Cl, or Br; and n is 0 or 1. Preferred adducts include those of the formula (where R, R', $R_3$ and X are as before):

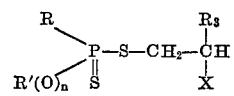

Most preferred compounds include those of the following formula (where R, R', and X are as before):

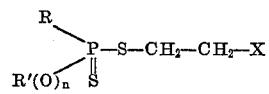

The following are typical of the preferred compounds:
S-chloroethyl O-ethyl ethanedithiophosphonate, S-bromoethyl O-methyl chloromethanedithiophosphonate, S-fluoroethyl diphenyl dithiophosphinate, S-cyanochloroethyl O-propyl methanedithiophosphonate, chloropropyl O-ethyl benzenedithiophosphonate, and dichloropropyl O-methyl cyclohexanedithiophosphonate, etc.

As previously indicated the present dithiophosphonic and dithiophosphinic acid-conjugated diene mono-adducts of this invention have the following general formulae:

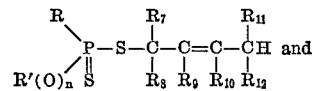

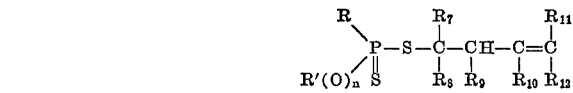

wherein each of the various R groups is as previously described. Also indicated previously as preferred compounds are included the above general type adducts of butadiene and its internally substituted derivatives such as those of the formula

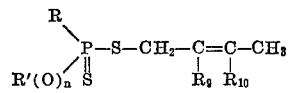

Some examples of the present conjugated diene adducts are as follows: S-crotyl dichlorophenyl dithiophosphinate, S-crotyl dimethyldithiophosphinate, S-crotyl O-methyl ethanedithiophosphonate, S - 1 - (2-chlorobuten-2-yl)-O-ethyl methanedithiophosphonate, S - 1-(2,3-dimethylbuten-2-yl)-O-amyl benzenedithiophosphonate, S-2-n-pentenyl O-methyl chlorobenzene-dithiophosphonate, S-3-pentenyl O-cyclohexyl chloromethanedithiophosphonate, S-2-(2,5-dimethylhexen - 3 - yl)-O-ethyl hydroxyethane dithiophosphonate, S - 2 - (cyanobuten - 2 - yl)-O-ethyl isopropanedithiophosphonate, S - 2 - (methylbuten - 2 - yl)-O - chlorophenyl benzenedithiophosphonate, S - 2 - (fluorobuten - 2 - yl)-O-fluoroethyl cyclohexanedithiophosphonate.

Novel cumulative diene adducts of this invention are as follows:

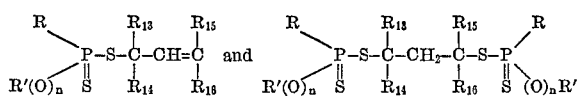

wherein the meaning of symbols is the same as described earlier.

A most preferred new composition of matter is the terminal adduct of allene represented by the following formula

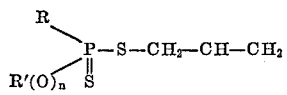

Examples of the claimed new cumulative diene adduct compositions are listed in the following:

S-allyl O-ethylmethanedithiophosphonate,
S-allyl O-dodecyl chlorobenzenedithiophosphonate,
S-allyl O-methyl cyclohexanedithiophosphonate,
S-allyl dimethylphenyl dithiophosphinate,
S,S'-trimethylene bis-(O-ethyl methanedithiophosphonate).

The last embodiment relating to new compositions concerns adducts of acetylenic compounds with the following general formulae:

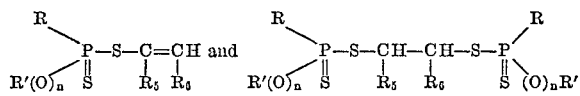

wherein the meaning of R's is again the same.

A particularly claimed species within this general type is the monoadduct of a monosubstituted acetylene or of acetylene itself, with the following general formula:

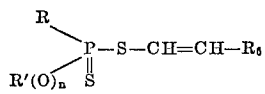

Exemplary of the present vinylic and ethylene bisdithiophosphonates and dithiophosphinates are as follows:

vinyl O-ethyl methanedithiophosphonate,
vinyl O-dodecyl benzenedithiophosphonate,
vinyl dichlorophenyldithiophosphinate,
propenyl O-ethyl methanedithiophosphonate,
propenyl O-methyl benzenedithiophosphonate,
hexenyl O-hexadecyl methanedithiophosphonate,
phenethenyl O-ethyl methanedithiophosphonate,
hydroxypropenyl O-chloroethyl cyclohexane dithiophosphonate,
chloropropenyl O-ethyl methanedithiophosphonate ethylene bis-(O-ethyl methanedithiophosphonate),
1,2-propylene bis-diphenyldithiophosphinate,
2-buten-2-yl O-methyl methanedithiophosphonate,
2-carbomethoxyethenyl O-methyl ethanedithiophosphonate.

While many of the dithiophosphonate and dithiophosphinate adducts of the present invention are useful as pesticides and oil additives, some of the novel types of compounds are particularly outstanding. As such the allylic esters resulting from additions to conjugated dienes and allene and the vinylic esters obtained via additions to acetylenes are to be particularly noted:

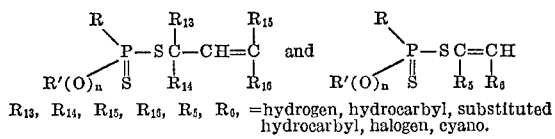

$R_{13}$, $R_{14}$, $R_{15}$, $R_{16}$, $R_5$, $R_6$, = hydrogen, hydrocarbyl, substituted hydrocarbyl, halogen, cyano.

For pesticidal applications R and R' are $C_1$–$C_6$ hydrocarbon radicals and the molecular weight of the compound is preferably under 400. In the case of allylic compounds the unsubstituted crotyl and allyl compounds are examples of attractive pesticidal compositions. Among the vinyl compounds preferred compositions may have a hydrogen for the $R_5$ and a hydrogen or methyl for the $R_6$ group.

As previously noted, the unsaturated or halogenated dithiophosphonic and dithiophosphinic acid adducts of this invention are useful as pesticides, particularly as insecticides. When used as insecticides, the foregoing biologically active adducts are preferably formulated with a suitable carrier or diluent or combinations thereof.

The term "carrier" or "diluent" as used herein means a material, which can be inorganic or organic and synthetic or of natural origin, with which the active ingredient of this invention is mixed or formulated to facilitate its storage, transport, and handling and application to the insect(s) to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be naturally occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes; or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the unsaturated or halogenated dithiophosphonic or dithiophosphinic acid adduct active ingredient.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax, or a microcrystalline wax such as those available under the registered trademark "Mikrovan wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or non-solvents for the active material. For example, the horticultural petroleum spray oils boiling in the range of from about 275° to about 575° F., or boiling in the range of about 575° to about 1000° F. and having an unsulfonatable residue of at least about 75% and preferably of at least about 90%, or mixtures of these two types of oil, are particularly suitable liquid carriers.

For application as a soil insecticide, the preferable carrier should be a granular inert carrier for example 25/50 mesh (U.S. sieve size) or can also be a simple or compound fertilizer which can be a solid, preferably granular or pelleted, or a liquid, as for example an aqueous solution in which the toxicant is suspended or emulsified.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the unsaturated or halogenated dithiophosphonic or dithiophosphinic acid adduct mixed with a dispersing, i.e., deflocculating or suspending, agent, and, if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of higher molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as, for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule; for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the active ingredient or by granulating a mixture of a finely divided solid carrier and the active ingredient. The carrier used can consist of or contain a fertilizer or fertilizer mixture, as, for example, a superphosphate.

The compositions of this invention can also be formulated as solutions of the active ingredient in an organic solvent or mixture of solvents, such as for example alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a non-aqueous phase.

The present invention is further illustrated in greater detail by the following examples, but it is to be understood that the present invention, in its broadest aspects, should not necessarily be limited in terms of the reactants or specific temperatures, residence time, separation techniques, pressures, solvents used, and other process conditions, or dosage levels, insects tested, exposure times, etc. by which the compounds and/or compositions described and claimed are prepared and/or used.

EXAMPLE 1

Addition of O-ethyl benzenedithiophosphonic acid to methylacetylene

A mixture of 87.3 grams (0.4 mole) of O-ethyl benzenedithiophosphonic acid and 44 grams (1.1 moles) of methylacetylene is irradiated at 15° C. with ultra-violet light from a high pressure mercury arc of a hundred watt Hanau immersion lamp for five days with magnetic stirring in a closed quartz tube. After releasing the excess methylacetylene, the liquid product was dissolved in 200 ml. of ether. Unreacted O-ethyl benzenedithiophosphonic acid was removed by washing the ether solution with nine 25 ml. portions of 5% aqueous sodium hydrogen carbonate solution, until the washings were neutral. According to the amount of sodium hydrogen carbonate needed for neutralization, the crude reaction mixture contained 32% unreacted O-ethyl benzenedithiophosphonic acid. The ether solution was then washed with one or more 25 ml. portions of 5% aqueous sodium hydrogen carbonate solutions and with 25 ml. of water. It was then dried over anhydrous sodium sulfate and the solvent evaporated in vacuo to yield 48 grams (39%) of a yellow liquid. Gas liquid chromatography (GLC) of this product indicated that it was about 83% pure. A fractional distillation of this crude product yielded 19.4 grams (19%) of the yellow liquid adduct, boiling in the range of 131–132° C. at 0.15 mm. pressure. Based on the amount of O-ethyl benzenedithiophosphonic acid consumed in this reaction, the yield of distilled product was 28%. The nuclear magnetic resonance (NMR) spectrum of the distilled product was consistent with the structure of the mono-adduct. Elemental analysis: Calculated for $C_{11}H_{15}OPS_2$ (percent): C, 51.14; H, 5.85. Found (percent): C, 50.99; H, 6.10.

EXAMPLE 2

Addition of O-ethyl benzenedithiophosphonic acid to 1,3-butadiene

A mixture of 43.6 grams (0.2 mole) of O-ethyl benzenedithiophosphonic acid and 11.1 grams (0.206 mole) of 1,3-butadiene was reacted for 43 hours in the manner described in Example 1. The reaction mixture was dissolved in ether, washed with 5% aqueous sodium hydrogen carbonate solution and with water, and was dried as described in Example 1. According to the amount of sodium hydrogen carbonate needed for neutralization, the crude reaction mixture contained 44% unreacted O-ethyl benzenedithiophosphonic acid. The solvent was removed in vacuo to yield 25.4 grams (37%) of a yellow liquid which was 80% pure according to GLC. Fractional distillation of this crude product yielded 14.2 grams (26%) of the yellow liquid adduct, boiling in the range of 143–147° C. at 0.2 mm. pressure. Based on the amount of O-ethyl benzenedithiophosphonic acid consumed in this reaction, the yield of distilled product was 37%. The NMR spectrum of the distilled product was consistent with the structure of the 1,4-mono-adduct.

Elemental analysis: Calculated for $C_{12}H_{17}OPS_2$ (percent): C, 52.92; H, 6.29; P, 11.37. Found (percent): C, 52.53; H, 6.44; P, 11.45.

EXAMPLE 3

Addition of O-ethyl benzenedithiophosphonic acid to allene

A mixture of 40 grams (0.18 mole) of O-ethyl benzenedithiophosphonic acid and 25 grams (0.62 mole) of allene was reacted for seven days in a manner described in Example 1. The reaction mixture was dissolved in ether, washed with 5% aqueous sodium hydrogen carbonate solution and then with water, and was dried as described in Example 1. According to the amount of sodium hydrogen carbonate needed for the neutralization, the crude reaction mixture contained 41% unreacted O-ethyl benzenedithiophosphonic acid. The solvent was removed in vacuo to yield 20.9 grams (30%) of a yellow liquid which was 68% pure according to GLC. Fractional distillation of this crude product yielded 8.8 grams (19%) of the yellow liquid adduct, boiling in the range of 129–132° C. at 0.2 mm. pressure. Based on the amount of O-ethyl benzenedithiophosphonic acid consumed in this reaction, the yield of distilled product was 32%. The NMR spectrum of the distilled product showed that it contained about 80% of the expected O-ethyl-S-allylbenzenedithiophosphonate and 20% of the ionic diadduct $[C_2H_5OP(\phi)S_2]_2C(CH_3)_2$.

Elemental analysis: Calculated for $C_{11}H_{15}OPS_2$ (percent): C, 51.14; H, 5.58; P, 11.99. Found (percent): C, 51.21; H, 6.55; P, 11.56.

EXAMPLE 4

Addition of O-ethyl benzenedithiophosphonic acid to vinyl chloride

A mixture of 39 grams (0.18 mole) of O-ethyl benzenedithiophosphonic acid and the 15 grams (0.24 mole) of vinyl chloride was reacted for 13 days in the manner described in Example 1. The reaction mixture was dissolved in ether, washed with 5% aqueous sodium hydrogen carbonate solution and then with water, and was dried as described in Example 1. According to the amount of sodium hydrogen carbonate needed for neutralization, the crude reaction mixture contained 41% unreacted O-ethyl benzenedithiophosphonic acid. The solvent was removed in vacuo to yield 19.1 grams (29%) of an orange liquid which was 75% pure according to GLC. Based on the amount of O-ethyl benzenedithiophosphonic acid consumed in this reaction, the yield was 48%. The NMR spectrum was consistent with the structure of the adduct.

Elemental analysis: Calculated for $C_{10}H_{14}ClOPS_2$ (percent): C, 42.78; H, 5.30; P, 11.03. Found (percent): C, 43.60; H, 5.88; P, 10.05.

EXAMPLE 5

Addition of O-ethyl ethanedithiophosphonic acid to methyl-acetylene

A mixture of 68 grams (0.4 mole) of O-ethyl ethanedithiophosphonic acid and 45 grams (0.12 mole) of methylacetylene was reacted for 3 days in a manner described in Example 1. The reaction mixture was dissolved in ether, washed with 5% aqueous sodium hydrogen carbonate solution and then with water, and was dried as described in Example 1. According to the amount of sodium hydrogen carbonate needed for neutralization, the crude reaction mixture contained only 4% unreacted O-ethyl ethanedithiophosphonic acid. The solvent was removed in vacuo to yield 68 grams (75%) of a yellow liquid which was 98% pure according to GLC. A fractional distillation of a 6-gram sample of this crude product yielded 3.92 grams (65%) of the colorless liquid adduct, boiling in the range of 74–75° C. and 0.3 mm. pressure. Based on the amount of O-ethyl ethanedithiophosphonic acid consumed in this reaction, the yield of crude product was 83% and the yield of distilled product was 68%. The NMR spectra of both crude and distilled products were consistent with the structure of the mono adduct.

Elemental analysis: Calculated for $C_7H_{15}OPS_2$ (percent): C, 39.98; H, 7.19; P, 14.73. Found (percent): C, 40.61; H, 7.55; P, 13.73.

EXAMPLE 6

Addition of O-ethyl ethanedithiophosphonic acid to phenylacetylene

A mixture of 35 gram (0.21 mole) of O-ethyl ethanedithiophosphonic acid and 63 grams (0.62 mole) of phenylacetylene was reacted for 2 days in a manner described in Example 1. However, after the reaction, the excess phenylacetylene, a liquid under ordinary conditions, was not removed from the reaction mixture. The crude reaction mixture was dissolved in ether, washed with 5% aqueous sodium hydrogen carbonate solution and then with water, and was dried as described in Example 1. According to the amount of sodium hydrogen carbonate needed for neutralization, the crude reaction mixture contained 15% unreacted O-ethyl ethanedithiophosphonic acid. The solvent was removed in vacuo to yield 46 grams (71%) of a yellow liquid which was 88% pure according to GLC. The NMR spectrum was consistent with the structure of the mono-adduct. Based on the amount of O-ethyl ethanedithiophosphonic acid consumed in this reaction, the yield was 84%.

EXAMPLE 7

Addition of O-ethyl ethanedithiophosphonic acid to ethyl propiolate

A mixture of 26 grams (0.15 mole) of O-ethyl ethanedithiophosphonic acid and 50 grams (0.51 mole) of ethyl propiolate was reacted for 13 days in a manner described in Example 1. However, after the reaction, the excess ethyl propiolate, a liquid under ordinary conditions, was not removed from the reaction mixture. The crude reaction mixture was dissolved in ether, washed with 5% aqueous sodium hydrogen carbonate solution and then with water, and was dried as described in Example 1. The solvent was then removed in vacuo to yield 39 grams (68%) of a brown liquid which was 70% pure according to GLC.

EXAMPLE 8

Addition of diphenyl dithiophosphinic acid to methylacetylene

To a solution of 62.5 grams (0.25 mole) of diphenyl dithiophosphinic acid in 20 grams dimethyl sulfide, 42 grams (1.05 moles) of methylacetylene was added in a quartz pressure tube. The tube was then closed and the magnetically stirred liquid reaction mixture irradiated at 15° C. An NMR spectrum of a sample taken after 48 hours indicated the formation of about 80% free radical type mono-adduct, i.e., propenyl diphenyl dithiophosphinate. After 137 hours of irradiation, the reaction was discontinued. The weight of the crude reaction product after the removal of the excess methylacetylene and dimethyl sulfide solvent indicated an essentially complete reaction of the starting dithiophosphonic acid. Nevertheless, to remove any acid present, a 15% ether solution of crude product was washed with a 5% aqueous sodium hydrogen carbonate solution. After drying and removal of the ether in vacuo, 61.5 grams of a slightly viscous, green, neutral product representing a 90% yield calculated for the mono-adduct was obtained. NMR confirmed the expected structure of the adduct and indicated about 85% purity.

EXAMPLE 9

Addition of dimethyldithiophosphinic acid to acetylene

In 50 ml. acetone 12.6 grams (0.1 mole) of dimethyl dithiophosphinic acid is dissolved. The solution is then placed into a quartz pressure tube and 20.8 grams (0.8 mole) of acetylene is condensed to it. The tube is then closed and irradiated as described in the previous examples to effect free radical addition.

Work-up of the reaction mixture after the extraction of the acid by distillation in vacuo yields vinyl dimethyl dithiophosphinate as a distillate and ethylene bis-dimethyl dithiophosphinate as a residue.

EXAMPLE 10

Addition of O-ethyl methanedithiophosphonic acid to acetylene

An excess of acetylene is reacted with O-ethyl methanedithiophosphonic acid in the manner described in the previous example to yield vinyl O-ethyl methanedithiophosphonate and ethylene bis-(O-ethyl methanedithiophosphonate).

EXAMPLE 11

Addition of O-fluoroethyl methanedithiophosphonic acid to dimethylbutadiene

A mixture of 17.4 g. (0.1 mole) of fluoroethyl methanedithiophosphonic acid and 8.2 g. (0.1 mole) dimethylbutadiene was reacted as described in Example 2 to yield S-2,3-dimethylbutene-2-yl O-fluoroethyl methanedithiophosphonate.

EXAMPLE 12

Insecticidal effectiveness of O-ethyl-S-propenyl ethanedithiophosphonate

Insecticidal tests were carried out on several insects such as mites using the product of Example 5 as to test chemical. Some of the positive results are described in the following:

Aphid-systemic test.—A nasturtium plant in a 2½ inch pot was infested with the bean aphid and was treated by applying 20 ml. of a formulation of the test chemical in acetone at 500 p.p.m. to the soil. The plants were held for 48 hours. The degree of control was 100%.

Aphid-spray test.—A potted nasturtium plant infested with the bean aphids was placed on a turntable and sprayed with the same formulation employed in the above aphid-systemic test at 500 p.p.m. The plants were held for 48 hours. The degree of control was 100%.

Mexican bean beetle.—Bean leaves were sprayed with the same formulated test chemical employed in the preceding tests and were allowed to dry. Individual treated leaves were then placed in a Petri dish and 5 Mexican bean beetle larvae were introduced. The leaves were held for two days. The degree of control was rated 80%.

Corn rootworm.—This test was done in the solid with larvae 7–10 days old in the following manner. Seventy-five ml. (90–100 grams) of an air dried solid-sand (2:1) mixture was placed in an 8-ounce plasticized cup. Ten ml. of a 3 p.p.m. stock equivalent to 0.3 p.p.m. or 5 pounds in a 6-inch deep acre, was pipetted onto the surface of the soil. The cup was capped and one hour later it was shaken vigorously thirty times. The cap was removed and two very young corn plants and five larvae were introduced. Readings on mortality five days later showed 100% control.

Houseflies.—Caged flies were sprayed with the same formulated test chemical employed in the preceding tests at 500 p.p.m. Two days later control was rated 100%.

Cholinesterase inhibition test.—To a solution of 0.2 unit of bovine cholinesterase in 2.97 ml. of a buffer solution containing 11.15 grams of disodium hydrogen phosphate dodecahydrate and 1.81 grams of potassium dihydrogen phosphate per liter of water, 0.03 ml. of a solution of the product of Example 5 in acetone was added. This mixture was then incubated in a water bath at 35° C. for 30 min. One ml. of a solution containing 100 milligrams of 5,5'-dithiobis-(2-nitrobenzoic acid), 100 milligrams of acetylthiocholine iodide, and 75 ml. of the above buffer solution in sufficient water to make 200 ml. was then added and the mixture again incubated in a water bath at 35° C. for 30 minutes more. The amount of inhibition of bovine cholinesterase was then determined from the absorbance of this solution at 420 m$\mu$. By using a series of solutions of the test chemical at various concentrations in acetone, the concentration needed for 50% inhibition was determined to be $2.5 \times 10^{-5}$ M.

The insecticidal effectiveness of organophosphorus compounds is generally attributed to cholinesterase inhibition. Determination of the cholinesterase inhibition is widely used to estimate the insecticidal potential of new organophosphorus compounds.

EXAMPLE 13

Insecticidal effectiveness of several unsaturated dithiophosphonates as compared to dithiophosphates Insecticidal tests were carried out on several insects as previously described and formulated as previously described. Several unsaturated dithiophosphates, also formulated as previously described, were also used as test chemicals to compare the insecticidal effectiveness of the above dithiophosphonates to the above dithiophosphates. The percent mortalities are summarized in Table I. In addition, some of the above test chemicals were applied at lower concentrations, and the percent mortalities produced at these concentrations are also summarized in Table I. The unsaturated dithiophosphonates tested gave, in general, better control than the corresponding dithiophosphates.

TABLE I.—INSECTICIDAL ACTIVITY OF UNSATURATED DITHIOPHOSPHONATES VERSUS DITHIOPHOSPHATES

| Product of Example | Structure | Conc., p.p.m. | Mexican bean beetle | Mite Spray | Mite Systemic | Aphid Spray | Aphid Systemic | House-fly | Corn rootworm Conc., p.p.m. | Corn rootworm Mortality percent | Cholinesterase inhibiting I₅₀ (Mole/liter) |
|---|---|---|---|---|---|---|---|---|---|---|---|
| | (C₂H₅O)₂PSCH=CHCH₃ (S) | 500 | 20 | 50 | 0 | 80 | 100 | 90 | 5 | 100 | 3.3×10⁻⁵ |
| 1 | C₆H₅(C₂H₅O)PSCH=CHCH₃ (S) | 500 | 100 | 80 | 0 | 100 | 100 | 100 | 5 | 100 | 6.4×10⁻⁵ |
| | | 250 | 100 | | | | | 100 | | | |
| | | 50 | 100 | | | | | | | | |
| | | 25 | 100 | | | | | | | | |
| | | 12.5 | 80 | | | | | | | | |
| 5 | (C₂H₅)(C₂H₅O)PSCH=CHCH₃ (S) | 500 | 80 | 100 | 100 | 100 | 100 | 100 | 5 | 100 | 2.3×10⁻⁵ |
| | | 250 | | | | 100 | 100 | 100 | 2.5 | 100 | |
| | | 50 | | | | | 100 | | 0.63 | 100 | |
| | | | | | | | | | 0.32 | 100 | |
| | | | | | | | | | 0.15 | 90 | |
| | (C₂H₅O)₂PSCH₂CH=CH₂ (S) | 500 | 0 | 0 | | | | 0 | 5 | 0 | 5.7×10⁻⁵ |
| 3 | C₆H₅(C₂H₅O)PSCHCH=CH₂ (S) | 500 | 100 | 70 | 0 | 100 | 40 | 60 | 5 | 20 | 1×10⁻⁵ |
| | (C₂H₅O)₂PSCH₂CH=CHCH₃ (S) | 500 | 0 | 0 | 0 | | | 100 | 5 | 30 | |
| 2 | C₆H₅(C₂H₅O)PSCH₂CH=CHCH₃ (S) | 500 | 100 | 0 | 0 | 50 | 0 | 100 | 5 | 100 | 3.1×10⁻⁶ |

EXAMPLE 14

Insecticidal effectiveness of several dithiophosphonates

Insecticidal tests were carried out on several insects using as the test chemicals the products of previously described and formulated chemicals. Some of the above test chemicals were also applied at lower concentrations. In addition, tests were conducted against the southern army worm and the rootworm nematode, as described below. The mortality produced in these tests is summarized in Table II. The results show that the novel compounds of the invention are effective against a wide variety of pests and inhibit the cholinesterase enzyme.

Southern army worm.—Bean leaves were sprayed with the formulated test chemical and were allowed to dry. Individual treated leaves were then placed in a Petri dish and 5 southern army worm larvae were introduced. The leaves were held for two days and the degree of control was then determined.

Root-knot nematode.—An air-dried 2:1 soil-sand mixture (125 ml.) in an 8-ounce plasticized container was infested with a stock of root-knot nematode prepared 7–10 days previously (at the rate of 6–7 grams of chopped galls per gallon of soil). Ten ml. of the formulated test chemical at 231 p.p.m. was poured onto the surface of the soil-sand mixture to give a rate equivalent to 25 pounds per 6″ acre. The container was then capped and shaken vigorously 1 hour later. The container was kept for 5–7 days, then shaken again and seeded with 4 cucumber seeds by placing the seeds on the surface and covering with ½″ of sand. After 3–4 weeks the roots were examined for galls and the degree of control determined.

In all of the above pesticidal tests, concentrated acetone solutions of the test chemicals were made up and then diluted with water to obtain aqueous emulsions, which were then applied to the plant or soil.

From the foregoing, it will be understood that the foregoing description is merely illustrative of preferred embodiments and specific examples of the present invention and that variations may be made in such embodiments and examples by those skilled in the art without departing from the spirit and purview thereof.

What is claimed is:

1. A process for preparing free radical adducts of dithiophosphonic and dithiophosphinic acids, comprising reacting an acid of the formula:

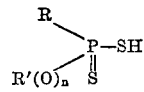

wherein R and R′ are selected from the group consisting of phenyl, phenyl monosubstituted with methoxy, methyl and chloro; $C_1$ to $C_5$ alkyl, $C_1$ to $C_5$ alkyl monosubstituted with chloro, hydroxy, and $n$ is 0 or 1, with an acetylene of the formula:

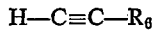

wherein $R_6$ is selected from the groups consisting of hydrogen, $C_1$ to $C_4$ alkyl, $C_1$ to $C_6$ alkyl monosubstituted with chloro, hydroxy; methyl-thio monosubstituted $C_1$ to $C_6$ alkyl; phenyl; phenyl monosubstituted with methoxy, methyl, chloro; and carbomethoxy, carboethoxy groups in a liquid phase in the presence of a free radical radiation catalyst at a temperature of between about $-100$ and about 200° C.

2. A process according to claim 1 wherein the $R_6$ group of the acetylenic reactant is $C_1$ to $C_4$ alkyl.

TABLE II—INSECTICIDAL ACTIVITY OF SEVERAL DITHIOPHOSPHONATES

| Product of example | Compound tested Structure | Conc., p.p.m. | Mexican bean beetle | Southern army worm | Mite Spray | Mite Systemic | Aphid Spray | Aphid Systemic | Housefly | Corn Rootworm Conc., p.p.m. | Corn Rootworm Mortality, percent | Root-knot nematode Conc., p.p.m. | Root-knot nematode Mortality, percent | Cholinesterase inhibiting $I_{50}$, mole/liter |
|---|---|---|---|---|---|---|---|---|---|---|---|---|---|---|
| 4 | (phenyl)(C$_2$H$_5$O)P(=S)SCH$_2$CH$_2$CH$_2$—Cl | 500/250 | 100/100 | | 100 | | 80 | | | 5 | 80 | | | $3.1\times10^{-5}$ |
| 6 | (C$_2$H$_5$)(C$_2$H$_5$O)P(=S)SCH=CH— (phenyl) | 500/250/50 | 100/100 | 100 | 100/95 | | | | 100/100/100 | | | | | $8.6\times10^{-6}$ |
| 7 | (C$_2$H$_5$)(C$_2$H$_5$O)P(=S)SCH=CHCO$_2$C$_2$H$_5$ | 500/250 | 100 | | 90/100 | | | | 100/100 | | | 25 | 90 | $5.7\times10^{-7}$ |

3. A process according to claim 1 wherein the $R_6$ group of the acetylenic reactant is phenyl.

4. A process according to claim 1 wherein the $R_6$ radical of the acetylenic reactant is selected from the group consisting of methyl and phenyl and the free radical initiator is ultraviolet light.

References Cited
UNITED STATES PATENTS

| | | | |
|---|---|---|---|
| 2,976,308 | 3/1961 | Bacon | 260—978 |
| 3,067,232 | 12/1962 | Baker | 260—978 X |
| 3,073,859 | 1/1963 | Pare | 260—978 |
| 3,340,332 | 9/1967 | Oswald et al. | 260—978 X |
| 3,449,474 | 6/1969 | Griesbaum | 260—978 X |

OTHER REFERENCES

Oswald et al.: "Petroleum Chem. Div. Preprints," vol. 8, No. 1, 1963, pp. 5–19.

Oswald et al.: "Petroleum Chem. Div. Preprints," vol. 9, No. 3, 1964, pp. 29–41.

LEWIS GOTTS, Primary Examiner

A. H. SUTTO, Assistant Examiner

U.S. Cl. X.R.

204—162 R; 252—46.6, 46.7; 260—928, 940, 941, 951, 955, 956, 957, 958, 961, 963; 424—210, 212, 219, 223